March 19, 1935.  H. C. BOSTWICK  1,994,561
TIRE BUILDING MACHINE
Filed Dec. 5, 1933
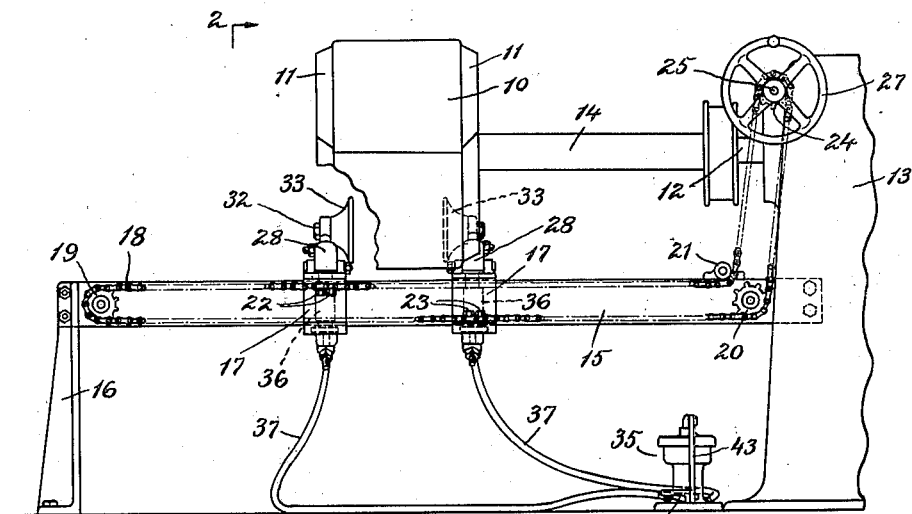
FIG. 1.
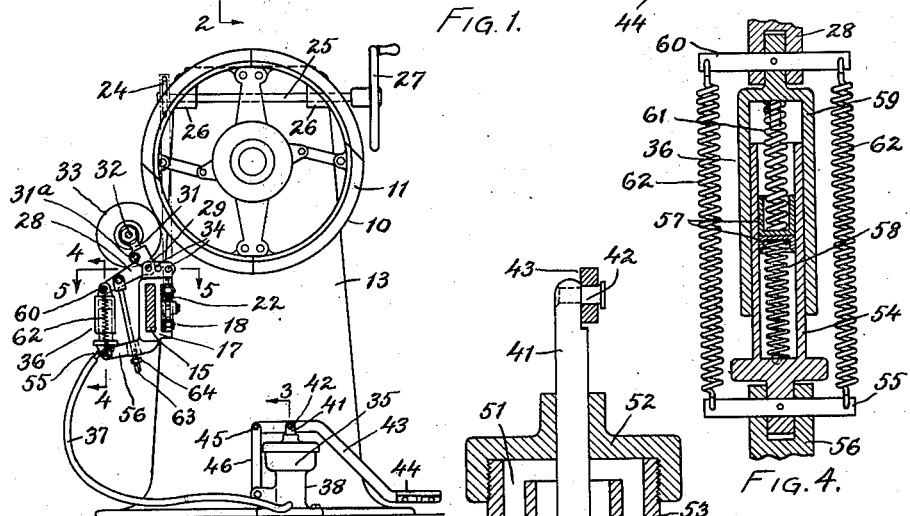
FIG. 2.   FIG. 7.   FIG. 4.
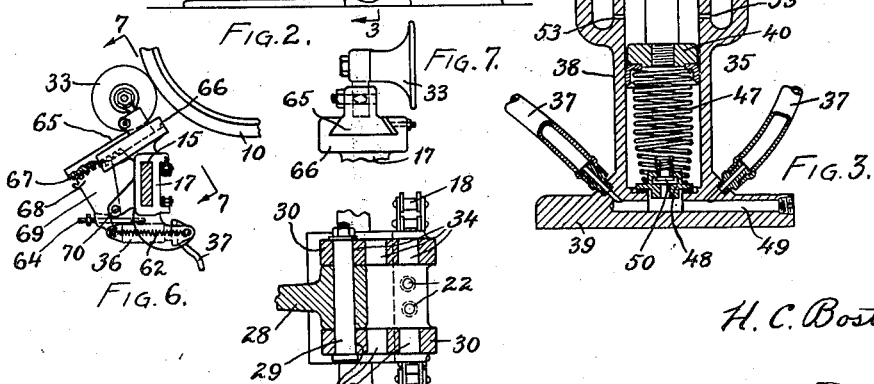
FIG. 6.   FIG. 5.   FIG. 3.
Inventor,
H. C. Bostwick.
By Robert M. Pierson.
Attorney Patented Mar. 19, 1935

1,994,561

UNITED STATES PATENT OFFICE 1,994,561

TIRE BUILDING MACHINE

Henry C. Bostwick, Coventry Township, Summit County, Ohio, assignor to The Akron Standard Mold Company, Akron, Ohio, a corporation of Ohio Application December 5, 1933, Serial No. 700,988

10 Claims. (Cl. 154—10)

This invention relates to tire building machines, and its general purpose is to provide improved devices for stitching or rolling down the components of a tire forming band upon the drum or former. One particular object is to improve the mode of imparting a cross-feed movement to the stitcher wheels, radially of the drum, to bring them into and out of position against the work and to equalize the pressure of a pair of such wheels, particularly in rounding the beads or the plies of material on the shoulders or bead seats at the ends of the drum. A further object is to improve the means for imparting an opposite longitudinal feeding movement to a pair of stitchers, widthwise of the building drum or form.

Of the accompanying drawing, Fig. 1 is a front side elevation, partly broken away, showing a tire building machine provided with my improvements.

Fig. 2 is an end elevation and section from the plane 2—2 of Fig. 1.

Fig. 3 is an enlarged vertical section of the hydraulic actuator on the line 3—3 of Fig. 2.

Fig. 4 is an enlarged vertical section of one of the hydraulic receivers on the line 4—4 of Fig. 2.

Fig. 5 is an enlarged horizontal section on the line 5—5 of Fig. 2.

Fig. 6 is a detail transverse section and end elevation showing a modified stitcher mounting.

Fig. 7 is a front side elevation of said modified mounting from the plane 7—7 of Fig. 6.

In the drawing, 10 is a rotary tire building drum shouldered at its ends with reduced bead seats 11 for building a tire band having inextensible beads, said drum being of a suitable segmental construction permitting it to be collapsed for removal of the completed band. The drum is carried by the outward end of a rotary driving shaft 12 projecting horizontally from the casing 13 containing the driving mechanism and being surrounded with a hollow shaft 14 for controlling the collapse and expansion of the drum.

Extending horizontally across the machine at the rear side thereof is a flat rectilinear guide-bar 15 with its width placed vertically and supported at one end by the casing 13 and at the opposite end by a standard or pedestal 16. On said guide-bar are slidingly mounted a pair of stitcher-supporting brackets 17 embracing the bar for carrying the stitchers in a feeding movement widthwise of the drum, parallel to its axis of rotation.

18 is an endless feed chain guided on the front face of the bar 15 by means including an idle sprocket wheel 19 at the outward end of said bar, forming a bight or loop in the chain which divides its horizontal portion into upper and lower stretches, and further including an idle sprocket wheel 20 for the lower stretch of the chain and an idle roller 21 for its upper stretch, at the inner end of said bar. The supporting bracket 17 for the left-hand stitcher as viewed in Fig. 1 is attached to the upper stretch of the chain 18 by screws 22 mounted on an upper flange of said bracket, and the left-hand bracket 17 is attached to the lower stretch of the chain by similar screws 23 mounted on a lower flange of the latter bracket, so that when tractive movement is applied to the chain the stitchers carried by the brackets will be equally moved in opposite directions. For moving the chain 18, it is led around the sprocket 20 and roller 21 in upright portions forming a bight which passes around an actuating sprocket wheel 24 fixed upon the rear end of a horizontal transverse power shaft 25 which is mounted above the level of the guide-bar 15 to turn in fixed bearings 26 on the casing 13. On the front end of the shaft 25 is fixed a suitable power member which in this case takes the form of a hand wheel 27, for which might obviously be substituted a motor such as an electric motor having suitable controls.

Each of the supporting brackets 17 has mounted on its upper edge a lever 28 turning upon a pivot pin 29 which is carried by ears or flanges 30 formed upon the bracket. The upper arm of said lever is formed as a socket for receiving a stem 31 upon whose upper end is mounted, for free turning movement about a substantially horizontal bearing pin or journal 32, a stitcher wheel 33 for rolling down the tire-band components on one-half of the drum width while the companion stitcher wheel rolls down the band components on the other half. The stitcher stem 31 is clamped in the socket of the lever 28 by a bolt 31ª and may be fixed in said socket at different angular adjustments to camber the plane of the stitching roller more or less with relation to the plane of the drum.

Provision is made for setting the stitcher lever 28 in varying projected and retracted positions transversely with reference to the drum periphery to accommodate drums of different diameters, in this instance by providing the ears 30 with a series of pairs of holes 34, in any pair of which the pivot pin 29 may be located, but any equivalent means to this end might be employed.

Radial movement is imparted to the stitching rollers 33 to bring them against or out of contact with the work upon the drum by swinging the respective levers 28. In the present invention, this is accomplished with manual power by hydraulic pressure transmitted from a treadle by the operator's foot, in such manner that the amount of foot pressure will control the stitcher pressure and the pressures of the two stitching rollers will be equalized and independent of their radial positions. Such actuation provides a simple and flexible form of pressure transmission and the equalization of pressures is of great advantage in tire building, particularly in stitching the plies around the shoulders of the drum 11 or over the beads on said shoulders, which, because of local high spots in the material or imperfect centralization of the stitchers with the drum, may not present the same height to both stitchers at the same time. The means to this end includes a fluid-pressure actuator or pusher designated generally at 35 and fixedly mounted upon the floor within convenient reach of the operator's foot, a pair of fluid-pressure receivers designated generally at 36 and carried by the respective stitcher brackets 17, and flexible transmitting pipes or tubes 37 connecting said receivers in parallel with the pusher 35.

The construction of the pusher 35 includes a vertical hydraulic cylinder 38 on a base 39, a single-acting piston 40 therein, attached to the lower end of a rod 41 whose upper end is pivotally connected at 42 with a foot lever 43 having a pedal 44 at its front end near the floor and rearwardly fulcrumed on a pin 45 at the upper end of a link 46 whose lower end is pivoted on the cylinder casing, together with a light spring 47 under the piston which constitutes a loading for a valve 48 controlling the return of liquid into the cylinder from a base passage 49 with which the pipes 37 are connected, and a spring-loaded check valve 50 carried by the valve 48 and controlling an outlet from the cylinder through said valve 48. There is further provided at the upper end of the cylinder 38 a reservoir chamber 51 having a screw-cap 52 through which the piston rod 41 passes and adapted to supply make-up liquid through a pair of ports 53 in the cylinder wall, uncovered by the piston in the highest position of the latter, for keeping the system full of liquid to compensate for leakages.

Each of the receivers 36 for applying fluid pressure to the corresponding stitcher wheel comprises a single-acting cylinder 54 pivoted by a pin 55 at its lower end to a rearwardly projecting arm 56 on the stitcher-supporting bracket 17, a piston 57 in the cylinder, the packing cup of which is held against the piston body by a light spring 58 under the piston, an external sleeve 59 telescoping on the cylinder a pivot pin 60 connecting the upper end of the sleeve with the lower arm of the stitcher-holding lever 28, a stiff spring 61 interposed between the piston and sleeve for yieldingly transmitting the pressure of the piston to the sleeve, and a pair of external pull-springs 62 connecting the ends of the pivot pins 55 and 56 for retracting the stitchers away from the work when the fluid pressure is removed. To limit the inward radial movement of the stitcher when it runs off the edge of the work, its lever 28 is provided with a pivoted stop-rod or link 63 having an adjustable nut 64 for engaging the under side of the bracket arm 56.

In the operation of this apparatus, the plies of tire material are laid upon the drum 10 in the usual manner and when they are to be rolled down, the stitching rollers 33 are first brought together in the middle of the drum periphery by a clockwise rotation of the feed shaft 25, causing the left-hand stitcher whose supporting bracket 17 is attached to the upper stretch of the chain 18 to move to the right, and the right-hand stitcher whose bracket is attached to the lower stretch of the chain to move to the left. The operator then steps on the pedal 44 of the lever 43, causing liquid to be expelled past the valve 50 from the cylinder of the pusher 35 through the flexible pipes 37 into the cylinders of the respective receivers 36 and thereby projecting the two stitching rollers 33 radially inward against the tire material upon the drum, the amount of stitcher pressure being proportional to that exerted by the operator's foot.

While the rolling pressure continues, the stitching rollers are fed apart longitudinally or widthwise of the drum by a counterclockwise rotation of the feeding shaft 25 by means of its hand wheel 27, and the material is thereby rolled down throughout the width of the band. The two receivers 36 being connected in parallel with each other to the pipes 37 having a feed connection with the pusher cylinder 38 through its discharge passage 49, the receiver pressures are thereby equalized, irrespective of the individual radial positions of the two stitching rollers, enabling either roller to surmount local humps such as seams in the material, and also enabling one stitcher to ride over the corresponding tire bead or the slope of the material on the drum shoulder 11, before the other, in case the drum or material is slightly off center in respect to the stitcher spacing, without producing inequality of stitching pressures. This result is practically impossible of attainment with ordinary arrangements wherein the stitchers are backed by springs and projected through a mechanical connection common to the two.

When the operator's foot pressure is removed from the lever 43, the springs 62 cause the levers 28 to be swung backwardly on their pivots, thereby retracting the stitching rollers 33 radially from the drum, and the liquid is thereby returned through the pipes 37 and past the spring-loaded valve 48 into the pusher cylinder 38. When the receivers 36 are thus relaxed, the pressure of the loading spring 47 for said valve is sufficient to prevent drainage of the remaining liquid column in the receiver cylinders and pipes, back through the pusher cylinder and its storage chamber 51, which might otherwise occur by reason of the receivers being at a higher level than the pusher.

Figs. 6 and 7 represent a modified stitcher mounting wherein a rectilinear cross-feed movement in place of a pivotal movement is imparted to the stitching roller 33 by mounting it upon a slide 65 movable in a guide 66 on the bracket 17. The lower side of the slide is formed with a toothed rack 67 engaging the teeth of a gear segment 68 formed on a lever 69 pivoted at 70 to an arm on the back of the bracket 17, the hydraulic receiver 36 in this case being pivotally mounted in a horizontal position upon the lower side of the bracket. For setting the initial position of the stitcher having a mounting of this type, to accommodate building drums of different diameters, the meshing of the rack 67 with the segment 68 may be changed as desired.

Various other modifications of embodiment could be made without departing from the scope of my invention as defined in the claims.

I claim:

1. In a tire building machine, the combination of a rotary shouldered drum, a pair of stitcher wheels coacting therewith, means for imparting opposite feed movements to said wheels longitudinally of the axis of rotation of the drum, and fluid-pressure means for imparting radial feed movements to said wheels including receiving cylinders and pistons for the respective wheels, a pushing cylinder and piston adapted to be actuated by the operator, and fluid-conducting connections from the pushing to the receiving cylinders having members in parallel for equalizing the pressures upon the receiving cylinders.

2. In a tire building machine, the combination of a rotary building form, rectilinear guiding means mounted parallel with the axis of rotation of said form, a pair of stitchers having supports slidable on said guiding means, means for imparting simultaneous opposite feed movements to the stitcher supports, a fixedly mounted hydraulic pusher adapted to be actuated by the manual power of the operator, hydraulic receivers carried by the stitcher supports for imparting movements to the stitchers radially of the form, and flexible fluid-conducting connections from said pusher to the receivers.

3. In a tire building machine, the combination of a rotary tire building drum, a pair of stitcher-wheel supports mounted for opposite rectilinear sliding movements parallel with the axis of rotation of said drum, stitcher wheels carried by slides having a rectilinear movement on said supports radially of the drum, fluid-pressure receivers on said supports for actuating the slides, and means for supplying fluid pressure to said receivers.

4. In a tire building machine, the combination of a rotary tire building form, a stitcher mounted for feed movement longitudinally of the axis of rotation of said form and also mounted for feed movement radially of the form, a hydraulic receiver carried with the stitcher in its longitudinal feed movements for imparting said radial feed movement, a treadle-actuated hydraulic pusher fixedly mounted below the level of said receiver, a storage chamber for supplying make-up liquid to said pusher, and valve devices in said pusher including means for preventing drainage of said receiver through said pusher into the storage chamber in the relaxed position of the pusher.

5. Apparatus according to claim 4 in which the valve devices include a spring-loaded return valve for preventing the back drainage, and an outlet check valve carried by said spring-loaded valve.

6. In a tire building machine, the combination of a rotary tire building form, a stitcher support having a rectilinear feed movement longitudinally of the axis of rotation of said form, a stitcher wheel carried on an arm pivoted to said support for moving the wheel radially of the form, and means for locating the arm pivot in different positions transversely of the form periphery to accommodate forms of different diameters.

7. In a tire building machine, the combination of a rotary tire building form, a rectilinear stitcher guide parallel with the axis of rotation of the form, a pair of stitchers slidingly movable in opposite directions on said guide, a stitcher-feeding shaft rotatably mounted above the level of said guide, flexible tractor means having oppositely movable stretches connected with the respective stitchers and with said shaft, and guiding devices for said tractor means forming a bight therein at one side of the machine and leading said tractor means at the other side from the stitcher-guiding level to the shaft level.

8. Apparatus according to claim 7 in which the tractor means is an endless chain having horizontal stitcher-feeding stretches and upright portions passing over a sprocket wheel on the feeding shaft and the guiding means includes a sprocket wheel in the bight of the chain, and another sprocket wheel at the end of the lower stretch of the chain for changing its direction into an upright course.

9. In a tire building machine, the combination of a rotary building drum, a stitcher wheel mounted for radial positioning movement with relation to said drum and also mounted for feed movement lengthwise of the drum, and means for effecting said radial positioning movement comprising a hydraulic receiver connected with the stitcher wheel, a manual-power hydraulic pusher adapted to graduate the stitcher-wheel pressure according to the manual pressure applied to said pusher by the operator, and a pressure-transmitting pipe connection between said pusher and receiver.

10. Apparatus according to claim 9 in which the pusher is stationarily mounted and provided with a pedal for applying foot pressure thereto.

HENRY C. BOSTWICK.